United States Patent [19]

Akuta

[11]  4,409,438
[45]  Oct. 11, 1983

[54] RINGING CONTROL CIRCUIT IN A TELEPHONE SWITCHING SYSTEM

[75] Inventor: Masajiro Akuta, Tokyo, Japan

[73] Assignee: OKI Electric Industry Co., Ltd., Japan

[21] Appl. No.: 265,630

[22] Filed: May 20, 1981

[30] Foreign Application Priority Data

May 24, 1980 [JP] Japan .................................. 55/69223

[51] Int. Cl.$^3$ ............................................. H04M 3/06
[52] U.S. Cl. ............................................. 179/18 HB
[58] Field of Search .............. 179/18 HB, 84 R, 84 A, 179/51 AA, 18 FA

[56] References Cited

U.S. PATENT DOCUMENTS

| | | | |
|---|---|---|---|
| 3,076,059 | 1/1963 | Meacham et al. ............. | 179/84 VF |
| 3,978,292 | 8/1976 | Hill et al. ........................ | 179/18 HB |
| 3,978,293 | 8/1976 | Feiner .............................. | 179/18 HB |
| 4,081,613 | 3/1978 | Reines et al. ..................... | 179/18 J |
| 4,145,577 | 3/1979 | Kojima et al. .................... | 179/18 HB |
| 4,310,728 | 1/1982 | Dumont ............................ | 179/18 HB |
| 4,355,206 | 10/1982 | Israel et al. ...................... | 179/18 HB |

Primary Examiner—Thomas W. Brown
Attorney, Agent, or Firm—Martin Novack

[57] ABSTRACT

In a ringing control circuit having a plurality of subscriber line circuits ($LC_0$ through $LC_3$) and a single ring trip circuit A (or a ringing loop-current detector) which operates commonly to all the subscriber line circuits ($LC_0$ through $LC_3$), an AND circuit (44) is provided in each subscriber line circuit ($LC_0$ through $LC_3$) for stopping the ringing operation by the subscriber line circuit. The ringing operation is initiated by said subscriber line circuit ($LC_0$ through $LC_3$), and is stopped when the subscriber lifts a handset. The AND circuit (44) stops the ringing operation upon reception of an answer detection signal from the ring trip circuit A indicating the lifting operation of a handset together with the phased ringing signal for the related subscriber. Thus, even when one subscriber lifts a handset, the ringing signals of other subscribers are not stopped, in spite of a single common ring trip circuit A. Thus, a central control unit does not need to re-energize a ringing operation of those subscribers which do not answer, when said ring trip circuit A provides an answer detection signal (a).

3 Claims, 6 Drawing Figures

RINGING CONTROL CIRCUIT IN A TELEPHONE SWITCHING SYSTEM

BACKGROUND OF THE INVENTION

The present invention relates to a ringing control circuit in a telephone switching system, in which a ringing signal is automatically stopped upon detection of an answer signal, and the switching operation is performed.

FIG. 1 shows a prior ringing control circuit. That kind of circuit is shown in U.S. Pat. No. 3,978,293, and U.S. Pat. No. 3,076,059, in which a ringing loop current detector which detects an answer signal is shared by groups of the line circuits for detecting call answer signals during active ringing on a call and for controlling the line circuits to stop the ringing upon a called party answer.

In FIG. 1, the symbol A is a ring trip circuit, $B_0$ through $B_3$ are subscriber ringing controllers, $C_0$ through $C_3$ and subscriber line scan circuits, $SUB_0$ through $SUB_3$ are subscribers, $LC_0$ through $LC_3$ are subscriber line circuits, (a) is an answer detection signal which shows that an answer signal is detected, $b_0$ through $b_3$ are subscriber ringing set signals, $c_0$ through $c_3$ are subscriber line scan signals.

In FIG. 1, when the first subscriber $SUB_0$ is called, the ringing set signal $b_0$ is originated in a computerized central control unit (not shown), and said signal $b_0$ is applied to the first ringing controller $B_0$, to which a continuous ringing signal CR is supplied from the ringing source RS. The ringing controller $B_0$ interrupts the continuous ringing signal CR to supply a ringing signal IR to the subscriber $SUB_0$. The interruption of the continuous ringing signal CR, or the period of the ringing signal IR is designated by the ringing control signal $b_0$. Thus, the subscriber $SUB_0$ is called by the ringing signal IR.

When other subscribers $SUB_1$ and/or $SUB_2$ are called at the same time as the first subscriber $SUB_0$ is being called, those subscribers are called simultaneously. In that case, the phase for the first ringing signal $IR_1$ to the first subscriber is different from that of other subscribers. That is to say, the active ringing interval and the silent ringing interval are staggered for each of the subscribers. Those staggered ringing signals are called the first phase ringing signal (I), the second phase ringing signal (II), and the third phase ringing signal (III), etc. (see FIG. 2). When the continuous ringing signal CR is divided to three phase ringing signals, the fourth subscriber can not be called, and if a call arrives to the fourth subscriber during the time these three subscribers are being called or ringing, the fourth subscriber is recognized as a busy subscriber. When the first subscriber $SUB_0$ lifts a handset in an active status, the loop current in the first subscriber is interrupted, and the ring trip circuit A detects that situation and provides the answer detection signal (a), which is supplied to all the subscriber ringing controllers $B_0$ through $B_3$. Then, all the ringing controllers $B_0$ through $B_3$ are released to stop the ringing operation of the subscribers. Thus, the answer signal of a single subscriber releases all the subscribers (see $t_1$ of FIG. 2). Next, the central control unit (not shown) scans the subscriber circuits $LC_0$ through $LC_3$ through the subscriber line scan signals $c_0$ through $c_3$, to detect which subscriber has not answered yet. If the subscribers $SUB_1$ and $SUB_2$ have not answered yet, the central control unit supplies the second phase control signal $b_1$ to the ringing controller $B_1$, and the third phase ringing control signal $b_2$ to the ringing controller $B_2$. Thus, the subscribers $SUB_1$ and $SUB_2$ are called or rung again at time $t_2$ (see FIG. 2).

Accordingly, when a single subscriber answers, the ringing signals of all the subscribers belonging to that subscriber group are stopped, and the ringing signals for the subscribers which have not answered yet are initiated again under the control of the central control unit. As the central control unit is generally implemented by a programmed computer, the structure of the program must be very complicated to handle those ringing signals. Further, when the program of the central control unit is in the queue, the program for ringing a subscriber must have a high priority for providing a ringing signal to a subscriber as if a ringing signal was not interrupted.

That interruption of a ringing signal of a subscriber which has not answered, and/or the high priority process of a ringing signal in the central control unit restrict the process capability of the central control unit, or restrict the number of subscribers who can belong to a single central control unit.

SUMMARY OF THE INVENTION

It is an object, therefore, of the present invention to overcome the disadvantages and limitations of a prior ringing control circuit by providing a new and improved ringing control circuit.

It is also an object of the present invention to provide a ringing control circuit in a telephone switching system, in which a ringing signal is not interrupted by the answer signal of other subscribers.

The above and other objects are attained by a ringing control circuit in a telephone switching system comprising (a) a plurality of subscriber line circuits in a group, each coupled with a subscriber; (b) a ringing source common to all the subscriber line circuits for providing a continuous ringing signal; (c) a ringing switch means provided for each subscriber for coupling said ringing source to each subscriber; (d) a ring trip circuit common to all the subscriber line circuits provided between said ringing source and the subscribers to detect an answer signal of subscribers; (e) each subscriber line circuit having a subscriber ringing controller for switching said ringing switch means to provide an interrupted ringing signal to a related subscriber, and a subscriber line scan circuit for detecting whether a handset is lifted; (f) said subscriber ringing controller starting ringing upon arrival of a call to the subscriber and finishing ringing upon detection of an answer signal by said ring trip circuit; (g) ringing phase selection means having as its outputs phase ringing signals equal to or less in number than the number of subscribers in a group, said phased ringing signals being alternately active; (h) each subscriber line circuit having an AND circuit, one input of which is the answer signal provided by said ring trip circuit, and the other input of which is one of the phased ringing signals; and (i) an output of said AND circuit causing a subscriber ringing controller to stop the ringing.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENT

Figure 3:
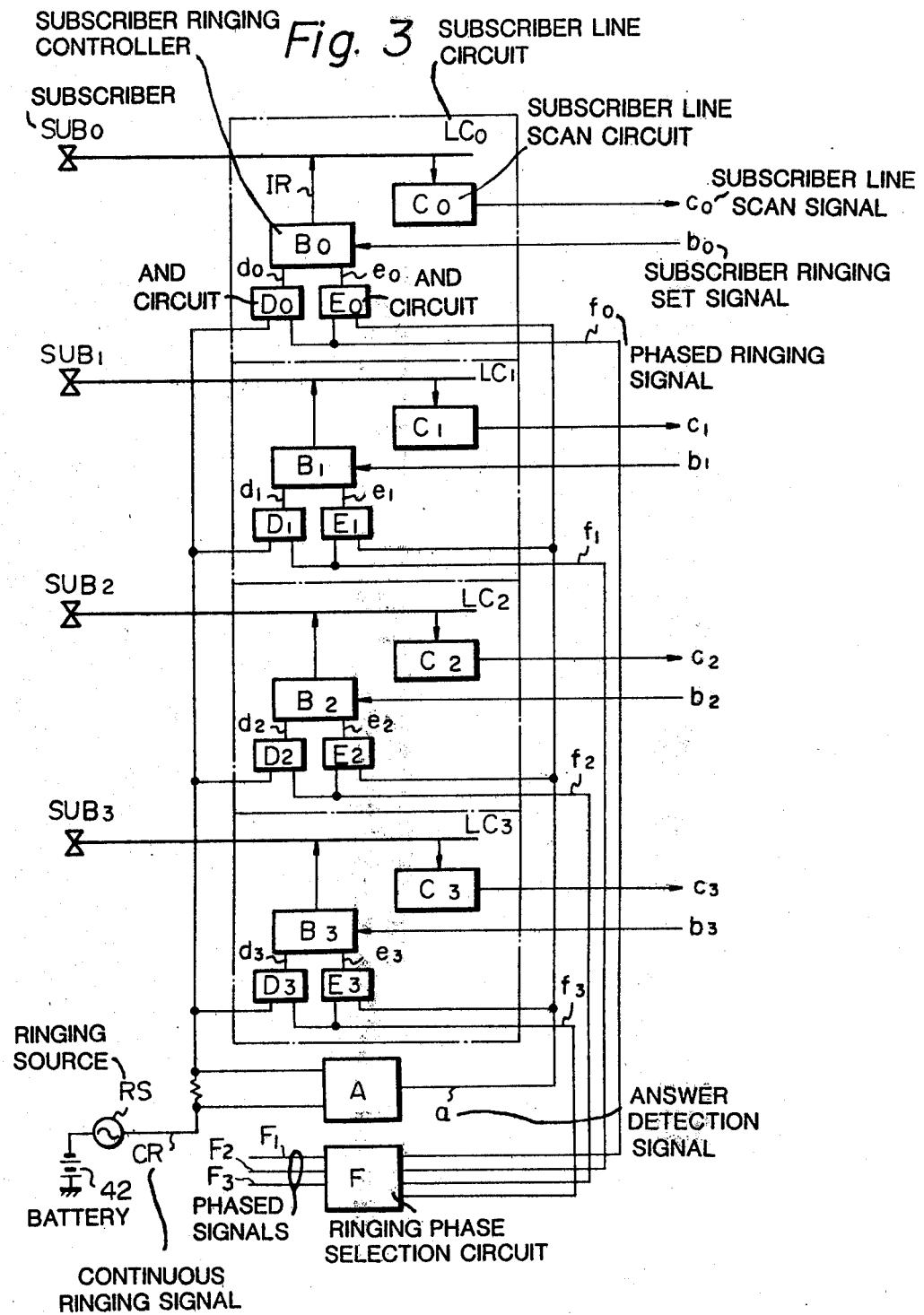
FIG. 3 is a block diagram of the present ringing control circuit in a telephone switching system.

FIG. 3 shows a block diagram of the first embodiment of the present ringing control circuit, in which four subscriber line circuits $LC_0$ through $LC_3$ are grouped, and a single ring trip circuit A is provided commonly to those subscriber line circuits. In FIG. 3, the symbols $B_0$ through $B_3$ are subscriber ringing controllers. The symbols $C_0$ through $C_3$ are subscriber line scan circuits. The symbols $D_0$ through $D_3$ and $E_0$ through $E_3$ are AND circuits. The symbol F is a ringing phase selection circuit, which receives three-phased signals $F_1$, $F_2$, and $F_3$ and provides four phased ringing signals $f_0$, $f_1$, $f_2$ and $f_3$ to four subscriber line circuits $LC_0$ through $LC_3$. The symbols $SUB_0$ through $SUB_3$ are subscribers, (a) is an answer detection signal which is the output signal of the ring trip circuit A. The symbols $b_0$ through $b_3$ are subscriber ringing set signals, $c_0$ through $c_3$ are subscriber line scan signals which originate in the subscriber scan circuits $C_0$ through $C_3$ and are sent to a central control unit (not shown). The symbols $d_0$ through $d_3$ are outputs of the AND circuits $D_0$ through $D_3$. The symbols $e_0$ through $e_3$ are output signals of the AND circuits $E_0$ through $E_3$.

Now, the operation of the ringing control circuit of FIG. 3 is described for the embodiment where there are three phases of ringing signals, and four subscriber line control circuits in a group.

It is assumed that the subscribers $SUB_0$ through $SUB_2$ are called at the same time. Then, the ringing phase selection circuit F selects the first phase signal $F_1$ to the line circuit $LC_0$, the second phase signal $F_2$ to the line circuit $LC_1$, and the third phase signal $F_3$ to the line circuit $LC_2$. Those phased signals $F_1$, $F_2$ and $F_3$ are staggered with one another and are applied to the first inputs of the AND circuits, $D_0$ through $D_2$, respectively, as phased ringing signals $f_0$, $f_1$, and $f_2$, respectively. Those AND circuits also receive the continuous ringing signal CR at the second inputs. Thus, the outputs $d_0$ through $d_2$ are the phased ringing signals which are periodically interrupted and staggered with one another. The subscriber ringing controllers $B_0$ through $B_2$ provides the interrupted ringing signals IR to the subscribers $SUB_0$ through $SUB_2$ according to the signals $d_0$ through $d_2$.

Then, it is assumed that the first subscriber $SUB_0$ lifts a handset in an active status and forwards an answer signal. That answer signal is detected by the ring trip circuit A which provides the answer detection signal (a) upon detection of the answer signal in any of the subscribers. The answer detection signal (a) is applied to the first inputs of the AND circuits $E_0$ through $E_3$, which receive also the phased signals $F_1$, $F_2$ and $F_3$. The phased signal is not applied to the AND circuit $E_3$ because the subscriber $SUB_3$ is not called. As the answer detection signal (a) coincides with one of the phased signals $F_1$ through $F_3$, one of the AND circuits $E_0$ through $E_2$ provides the output signal, when that AND circuit receives the phased signal and the answer detection signal (a) simultaneously. In the present embodiment, the AND circuit $E_0$ provides the output signal $e_0$, which causes the subscriber ringing controller $B_0$ to stop the ringing signal to the subscriber $SUB_0$. In that case, the AND circuits $E_1$ and $E_2$ do not provide an output signal, since the answer detection signal (a) does not coincide with the phased signals in those AND circuits, and thus, those subscriber ringing controllers $B_1$ and $B_2$ do not stop the ringing signals. Therefore, the ringing signal to the subscriber $SUB_0$ is stopped by the answer detection signal (a), while the ringing signals to other subscribers are not stopped by the answer detection signal (a). The fact that the subscriber $SUB_0$ lifts a handset is held in the subscriber scan circuit $C_0$. Therefore, when a central control unit scans or reads those subscriber line scan circuits $C_0$ through $C_3$, the central control unit can recognize the fact that the subscriber $SUB_0$ lifts a handset, although the answer detection signal (a) is common to all the subscribers.

Figure 4A:
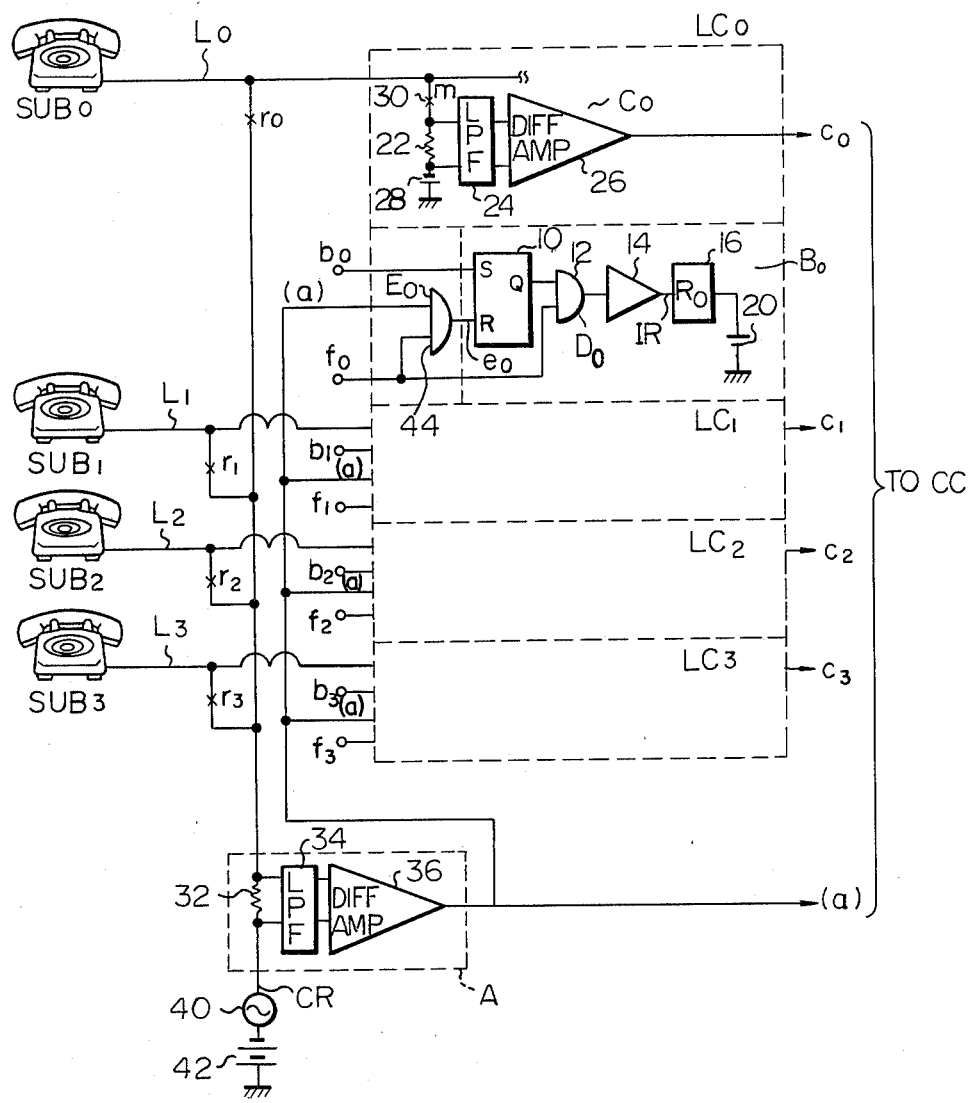
FIG. 4A is a block diagram of another ringing control circuit according to the present invention.
Figure 4B:
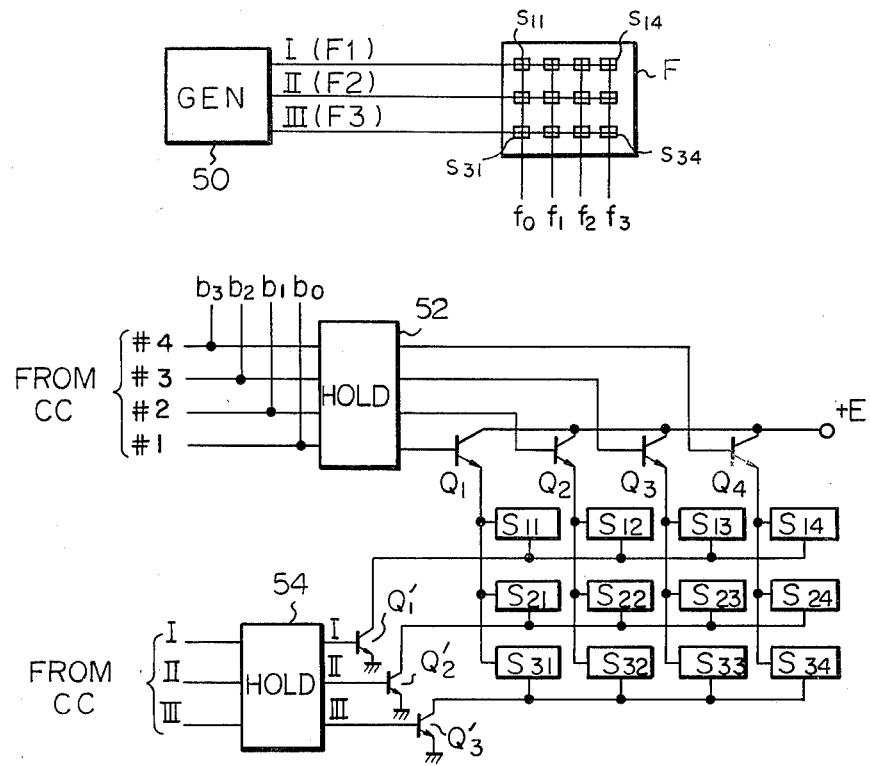
FIG. 4B is a block diagram of a ringing phase selection arrangement which is used with the apparatus of FIG. 4A.

Next, the second embodiment of the present ringing control circuit is described in accordance with FIGS. 4A and 4B, in which the same reference numerals show the same members as those in FIG. 3. In FIG. 4A, four subscriber line circuits $LC_0$ through $LC_3$ are grouped, and are connected to the subscribers $SUB_0$ and through $SUB_3$, respectively. A single ring trip circuit A, together with a ringing source 40 with a battery 42 are provided common to all the subscriber line circuits.

For the sake of simplicity of explanation, a single subscriber line circuit $LC_0$ is shown in FIG. 4A.

The ringing source generates the continuous ringing signal CR, which is supplied to each of the subscribers ($SUB_0$ through $SUB_3$) through the ring trip circuit A, a relay contact or a ringing switch ($r_0$, $r_1$, $r_2$, or $r_3$). Those relay contacts or ringing switches $r_0$ through $r_3$ connect the continuous ringing signal CR to each of the subscribers, periodically, to provide an interrupted ringing signal.

The ring trip circuit A has a resistor 32 inserted in the ringing line, a low pass filter 34 across said resistor 32, and a differential amplifier 36 connected to the output of the low pass filter 34. When one of the subscribers lifts a handset, the ringing current in the circuit or in the resistor 32 changes, and that change is detected by the differential amplifier 36 through the low pass filter 34. Thus, the ring trip circuit A provides the answer detection signal (a) upon detection of the lifting of a handset in any subscriber. That answer detection signal (a) is provided to the subscriber line circuits $LC_0$ through $LC_3$, and also, that answer detection signal is provided to a central control unit (CC) to provide a program interrupt to that central control unit.

The subscriber line circuit $LC_0$ has the subscriber line scan circuit $C_0$, the subscriber ringing controller $B_0$, and the AND circuit 44. The presence of the AND circuit 44 in the line circuit is an important feature of the present invention.

The subscriber ringing controller $B_0$ comprises flip-flop 10, AND circuit 12, current driver 14, and relay 16 which is activated by battery or power source 20. The delay ($R_0$) 16 has a relay contact or a ringing switch $r_0$, which interrupts the continuous ringing signal CR to provide an interrupted ringing signal to the subscriber $SUB_0$. The flip-flop 10 is set to one status by the subscriber ringing set signal $b_0$ which is supplied from the speech path control circuit of FIG. 4B, and is reset to zero status by the output $e_0$ of the AND circuit 44.

The AND circuit 44 provides the output signal $e_0$ when the answer detection signal (a) appears while the phased ringing signal $f_0$ is in active status. That is to say, the AND circuit 44 provides an output signal $e_0$ only when the subscriber $SUB_0$ lifts a handset when that subscriber is being rung, although the answer detection signal (a) appears irrespective of which subscriber lifts a handset.

The AND circuit 12 provides the logical product of the output of the flip-flop 10 and the phased ringing signal $f_0$, which is supplied from the circuit of FIG. 4B. The output of the AND circuit 12 is applied to the relay 16 through the power driver 14 which amplifies the output of the AND circuit 12. Thus, the relay ($R_0$) 16 connects or disconnects the contact $r_0$ according to the phased ringing signal $f_0$. And, the interrupted ringing signal which is synchronized with the phased ringing signal $f_0$ is supplied to the subscriber $SUB_0$ through that contact $r_0$.

Figure 1:
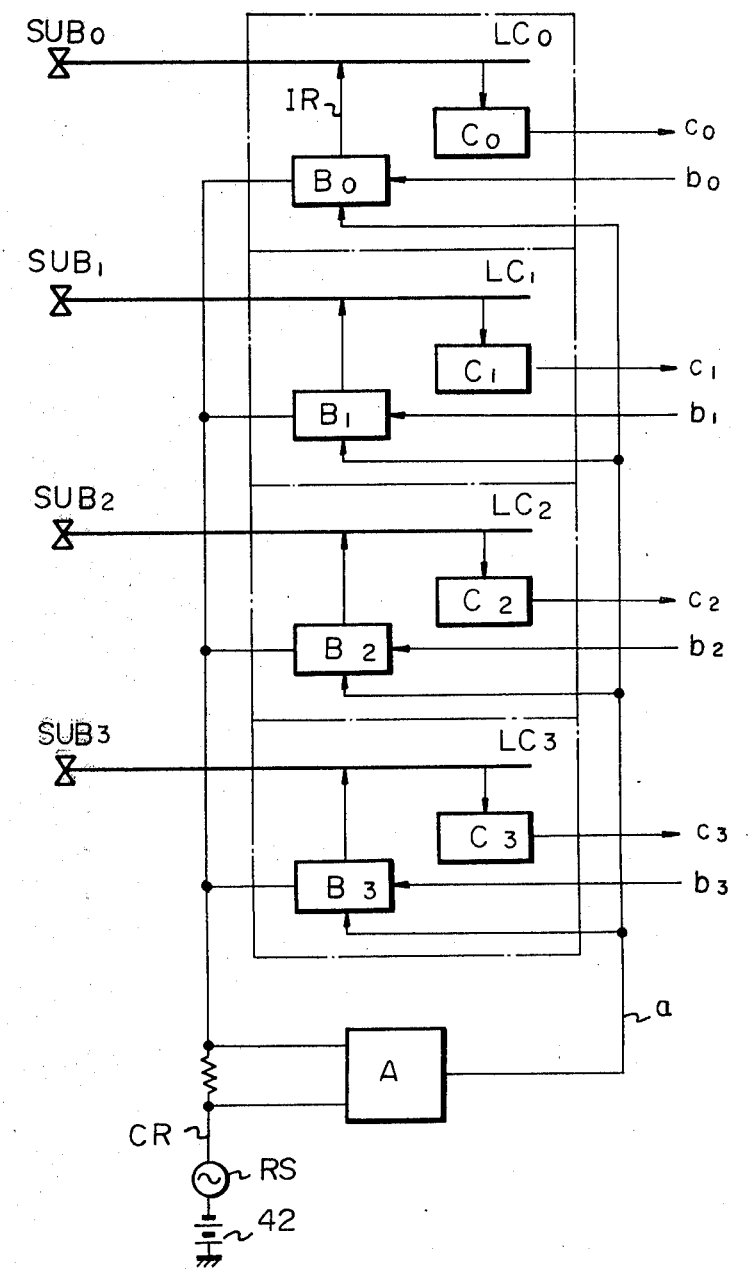
FIG. 1 shows a prior ringing control circuit in a telephone switching system.
Figure 2:
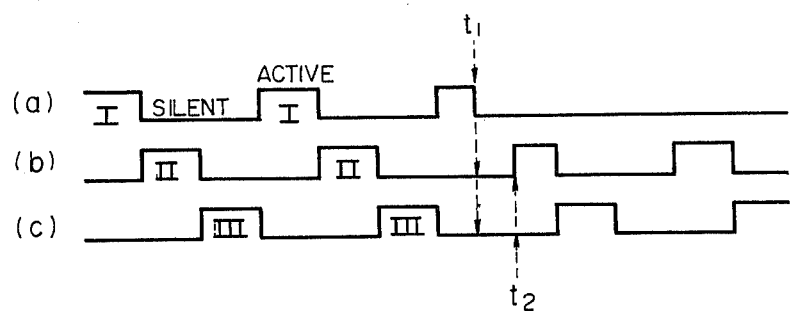
FIG. 2 is a time sequence of the ringing control circuit of FIG. 1.
Figure 5:
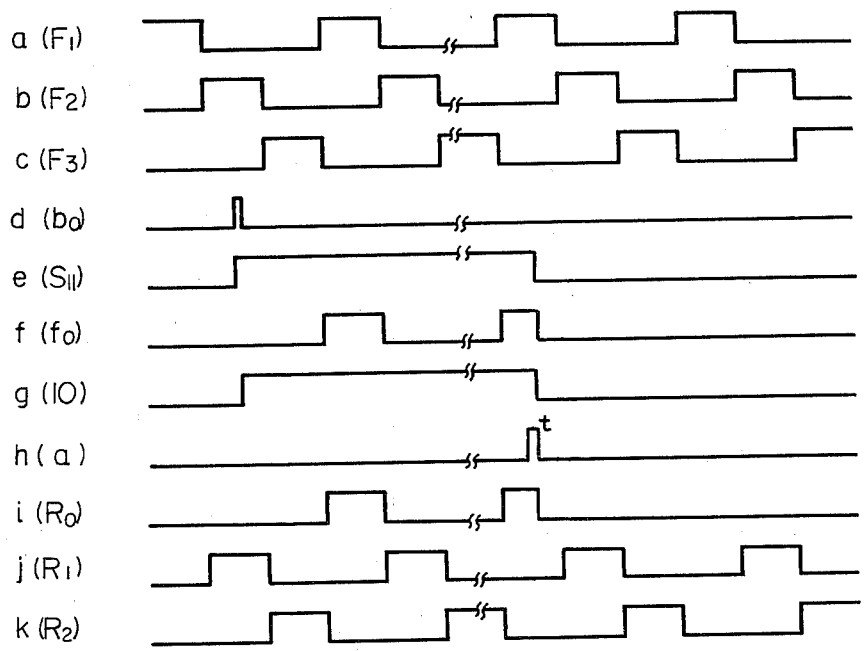
FIG. 5 is a time sequence of the ringing control circuit according to the present invention.

FIG. 4B shows a block diagram of a ringing phase selection arrangement which supplies the subscriber ringing set signals ($b_0$ through $b_3$) and the phased ringing signals ($f_0$ through $f_3$). In this figure, the reference numeral 50 is a phased signal generator, which provides three phased signals $F_1$, $F_2$ and $F_3$, as shown in FIG. 5(a), FIG. 5(b) and FIG. 5(c), respectively. The reference numerals 52 and 54 are holding circuits. The central control unit CC (not shown) provides one of the control signals (#1, #2, #3 or #4) to the first holding circuit 52, and one of the phase selection signals (I, II or III) to the second holding circuit 54. When the first subscriber line circuit $LC_0$ is to be called with the first phased signal (I), then, the central control unit CC provides the first control signal #1 and the first phase selection signal (I). The first holding circuit 52 causes the transistor switch $Q_1$ to turn ON according to the control signal #1, and the second holding circuit 54 causes the transistor switch $Q_1'$ to turn ON according to the phase selection signal (I). Then, the current flows from the power source $+E$ through the transistor switch $Q_1$, the relay $S_{11}$, the transistor switch $Q_1'$, to the ground. Then, the relay $S_{11}$ is activated, and the contact $S_{11}$ is turned to ON status. Then, the phased ringing signal $f_0$ is provided from the generator 50, through the contact $s_{11}$ of the relay $S_{11}$, to the subscriber line circuit $LC_0$ of FIG. 4A.

The subscriber ringing set signals $b_0$, $b_1$, $b_2$, and $b_3$ are the same as the control signals #1, #2, #3 and #4, respectively.

When the subscriber ringing set signal $b_0$ is provided by the central control unit CC as shown in FIG. 5(d), together with the phase selection signal (I), the relay $S_{11}$ contacts (see FIG. 5(e)) to pass the first phased ringing signal $f_0$ (see FIG. 5(f)). That subscriber set ringing signal $b_0$ also sets the flip-flop 10 of FIG. 4A (see FIG. 5(g)). Then, the output of the AND circuit 12, or the relay ($R_0$) 16 is shown in FIG. 5(i). Then, the ringing signal synchronized with the operation of the relay ($R_0$) 16 is provided to the subscriber $SUB_0$. In the above situation, it is assumed that the subscribers $SUB_1$ and $SUB_2$ are being rung as shown in FIG. 5(j) and FIG. 5(k), respectively.

When the subscriber $SUB_0$ lifts a handset, and the answer detection signal (a) is generated by the ring trip circuit A, as shown in FIG. 5(h) at time t, that answer detection signal (a) is applied to the AND circuit 44 of FIG. 4A. That AND circuit 44 also receives the first phased ringing signal $f_0$, and provides the output signal $e_0$, which resets the flip-flop 10 (see FIG. 5(g)). Therefore, the relay ($R_0$) 16 is released, and the contact $r_0$ is disconnected, then, the ringing signal is not forwarded to the subscriber $SUB_0$ any more.

The fact that the subscriber $SUB_0$ lifts a handset is also recognized by the subscriber scan circuit $C_0$ of the subscriber line circuit $LC_0$. That subscriber scan circuit $C_0$ has resistor 22, low pass filter 24, differential amplifier 26 and battery 28, and the structure is the same as the ring trip circuit A. The configuration of the ring trip circuit A and/or the subscriber scan circuit is well known. The subscriber scan circuit $C_0$ is connected to the subscriber $SUB_0$ through the line $L_0$ and the contact (m), which is usually in ON status. The battery 28 operates to supply the speech current to the subscriber.

When the answer detection signal (a) is generated by the ring trip circuit A following the lifting of a handset of the subscriber $SUB_0$, that answer detection signal (a) effects a program interruption in a central control unit CC (not shown), then, the central control unit CC scans the subscriber scan circuits $C_0$ of all the subscriber line circuits $LC_0$ through $LC_3$ through the subscriber line scan signals $c_0$ through $c_3$. In the present embodiment, the first scan signal $c_0$ is active, and other signals $c_1$ through $c_3$ are not active, then, the central control unit CC recognizes that the subscriber $SUB_0$ has lifted a handset. Then, the central control unit CC also releases the control signal #0, and the phase selection signal (I) (see FIG. 4B).

In the above explanation, it should be noted that the AND circuit 44 does not provide an output signal $e_0$ even when other subscribers $SUB_1$ through $SUB_3$ lift a handset, because the answer detection signal (a) by other subscribers does not coincide with the phase ringing signal $f_0$. Therefore, the ringing signal of the subscriber $SUB_0$ is not disturbed by other subscribers, although the ring trip circuit A is common to all the subcribers. Similarly, the answer detection signal by the subscriber $SUB_0$ does not disturb the ringing operation of the other subscribers $SUB_1$ through $SUB_3$.

Many modifications of the present invention are possible to those skilled in the art from the above description. For instance, the number of phased signals ($F_1$, $F_2$, and $F_3$) is not restricted to three, but embodiments with two phased signals, or with more than four phased signals are possible according to the number of the subscribers. Said phased signals may be obtained either through hardware process, or through a software process. Further, the number of the subscriber line circuits in a group is not restricted to four, but said group may have eight, twelve, or sixteen subscriber line circuits, for example.

As described above in detail, according to the present invention, in spite of a common single ring trip circuit to all the subscribers in a group, the answer detection signal (a) of said ring trip circuit does not disturb the ringing operation of other subscriber line circuits in which subscribers have not answered. Accordingly, a central control unit CC does not need to ring again those subscribers which do not answer, and thus, the structure of the program of the central control unit CC is simplified, and also, a program for ringing subscribers may operate with low priority in a central control unit CC.

From the foregoing it will now be apparent that a new and improved ringing control circuit has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A ringing control circuit for a telephone exchange system comprising:
   (a) a plurality of subscriber line circuits in a group, each coupled with a subscriber,
   (b) a ringing source common to all the subscriber line circuits for providing a continuous ringing signal,
   (c) a ringing switch means provided for each subscriber for coupling said ringing source to each subscriber,
   (d) a ring trip circuit common to all the subscriber line circuits provided between said ringing source and the subscribers to detect an answer signal of subscribers,
   (e) each subscriber line circuit having a subscriber ringing controller for switching said ringing switch means to provide an interrupted ringing signal to a related subcriber, and a subscriber line scan circuit for detecting whether a handset is lifted,
   (f) said subscriber ringing controller starting ringing upon arrival of a call to the subscriber and finishing ringing upon detection of an answer signal by said ring trip circuit, characterized in that
   (g) a ringing phase selection means is provided, having as its outputs phased ringing signals equal to or less in number than the number of subscribers in a group, said phased ringing signals being alternatively active,
   (h) each subscriber line circuit having an AND circuit with two inputs, one input of which is the answer signal provided by said ring trip circuit, and the other input of which is one of the phased ringing signals,
   (i) an output of said AND circuit causing a subscriber ringing controller to stop the ringing.

2. A ringing control circuit according to claim 1, wherein the number of subscribers in a group is four, and said ringing phase selection means has three outputs.

3. A ringing control circuit according to claim 1, wherein each of said subscriber ringing controllers has a flip-flop (10) and a second AND circuit (12), said flip-flop (10) is set to ON status upon arrival of a call, and is reset to OFF status by the output of said first mentioned AND circuit (44), the inputs of the second AND circuit (12) are the output of said flip-flop (10) and each output of said ringing phase selection means, and the output of the second AND circuit (12) steers the ringing switch means.

* * * * *